(12) United States Patent
Moore

(10) Patent No.: US 11,565,556 B1
(45) Date of Patent: Jan. 31, 2023

(54) TIRE VALVE ASSEMBLY

(71) Applicant: Wayne-Ian Moore, Changhua (TW)

(72) Inventor: Wayne-Ian Moore, Changhua (TW)

(73) Assignee: THE LEGION ENGINEERING CORPORATION, Changhua (TW)

( * ) Notice: Subject to any disclaimer, the term of this patent is extended or adjusted under 35 U.S.C. 154(b) by 0 days.

(21) Appl. No.: 17/579,593

(22) Filed: Jan. 20, 2022

(51) Int. Cl.
*B60C 29/00* (2006.01)
*B60C 29/06* (2006.01)
*F16K 15/20* (2006.01)

(52) U.S. Cl.
CPC ............ *B60C 29/005* (2013.01); *B60C 29/06* (2013.01); *F16K 15/205* (2013.01); *Y10T 137/3631* (2015.04)

(58) Field of Classification Search
CPC . B60C 29/06; Y10T 137/3584; Y10T 137/36; Y10T 137/3631; Y10T 137/3786; Y10T 137/7904; F16K 15/20
See application file for complete search history.

(56) References Cited

U.S. PATENT DOCUMENTS

| | | | | | |
|---|---|---|---|---|---|
| 1,212,641 | A | * | 1/1917 | Hilding | F16K 15/20 137/232 |
| 1,559,887 | A | * | 11/1925 | Phillips | F16K 15/20 137/234.5 |
| 1,865,580 | A | * | 7/1932 | Michelin | F16K 15/20 137/614.2 |
| 2,488,456 | A | * | 11/1949 | Walker | F16K 15/20 137/234.5 |
| 4,275,756 | A | * | 6/1981 | Cairns | B60C 29/00 137/234.5 |
| 4,462,449 | A | * | 7/1984 | Zabel, Jr. | B60C 29/00 152/428 |
| 7,066,442 | B2 | * | 6/2006 | Rose | F16K 15/20 251/149.8 |
| 2019/0390785 | A1 | * | 12/2019 | Moore | F16K 15/20 |

FOREIGN PATENT DOCUMENTS

| | | | | |
|---|---|---|---|---|
| DE | 102018125649 | A1 * | 4/2020 | B60C 29/005 |
| WO | WO-2011107097 | A2 * | 9/2011 | F16K 15/20 |

* cited by examiner

*Primary Examiner* — Robert K Arundale

(57) ABSTRACT

A tire valve assembly includes a stem and a valve unit. The valve unit includes a movable part and a seal member. When introducing pressurized air into the tire valve assembly, the valve unit moves to a position in the stem to allow the pressurized air to flow into the tire. When the pressurized air is stopped from entering the tire valve assembly, the valve unit is pushed back by the pressure in the tire to seal the inlet so that the pressurized air in the tire does not leak to keep the tire pressure.

8 Claims, 13 Drawing Sheets

TIRE VALVE ASSEMBLY

BACKGROUND OF THE INVENTION

1. Fields of the Invention

The present invention relates to a tire valve assembly, and more particularly, to a high-volume tire valve assembly.

2. Descriptions of Related Art

Tire valve is installed on the rim for external inflation to the inside of the tire. The tire valve includes mainly a seat and air nozzle head, wherein the seat is connected to the rim and one end is connected to the tire, the other end is connected to the air nozzle head which is able to be connected to an external inflation device to introduce pressured air into the tire.

One of the commonly seen air nozzle heads in the market is called as a knob type nozzle head 7, as shown in FIGS. 11 to 13, the knob type nozzle head 7 includes a valve stem 710, a nozzle body 720 and a knob 730. When in use, the knob 730 located on the stem 710 threaded segment 711 needs to be screwed inward or outward to control the knob type nozzle head 7 in an open status or a closed status. Because the knob type nozzle head 7 is controlled by way of screwing in or out, the knob 730 may not be tightened, loosed or mistakenly touched during use, which will lead to leakage of gas from the knob type nozzle head 7. When the knob 730 is rotated out, because the threaded segment 711 on the stem 710 includes fine threads which are relatively fragile, so that when applying pump head, removing pump head or even from the pumping action when using hand pumps, as these actions apply side force to the threaded section 711 which are not seen in normal operation, the threaded section 711 may be accidentally distorted, damaged or even broken.

As shown in FIGS. 11 to 13, the eleventh and thirteenth figures, knob type nozzle head 7 includes a guide groove 722 defined in the inner periphery of the air channel 721 of the nozzle body 720 so as to be mounted to the stem 710 having the axial bar 712. By rotating the knob 730, the stem 710 can be controlled in and out, and then the nozzle head is in the open status or the closed status. When the nozzle head is opened by rotating the knob 730, there is only a very small gap formed between the air channel 721 to provide gas flow, the time for inflation and deflation of the tire is too long.

Taiwanese patent No. 701168 reveals a high-flow two-stage valve which is mainly composed of a valve stem, an outer tube and a regulating sleeve. By adjusting the adjustment sleeve inlet to control the outlet and inlet, at the same time, because of the structure in valve stem, the volume of air flow in valve is higher than the commonly seen valve.

However, although the patent which has mentioned above has increased the volume of air flow in valve, the problem that valve stem is relatively slim and fragile has still not been solved.

Furthermore, the conventional knob type nozzle head and the high-flow two-stage valve which has mentioned above are both involved a large number of small parts which lead to complex assembly problems because using the stem and the knob (adjustment sleeve). Besides, the metal nozzle body and the stem need to be manufactured with high precision, and axial strip and the guide groove are complex and hard to be machined, therefore, a high manufacturing costs is involved.

The present invention intends to provide a tire valve assembly to eliminate shortcomings mentioned above.

SUMMARY OF THE INVENTION

This present invention does not need the stem and knob as disclosed in the conventional structure, so as to solve the shortcomings of mistakenly touching the knob and the stem to damage the threaded section. In addition, the present invention involves a less number of parts and optimizes the material and size of these parts, so that the parts of the present invention are easily to be processed and machined. Besides, because the stem and the knob are not necessary, and parts are formed in the through passage and the chamber of the present invention, so that the size of the parts of the present invention can be made larger than the conventional ones. That is to say, a large hole or bore can be easily drilled to provide high volume of air flow so as to increase the efficiency for inflation or deflation of the tires.

The present invention provides a tire valve assembly and comprises a stem and a valve unit. The stem includes a first section, a second section and a third section. The first section includes a through passage, and the second section includes a chamber which communicates with the through passage. A flange extends radially and inward from the conjunction portion between the through passage and the chamber. The valve unit includes a movable part and a seal member wherein the movable part is movably located in the through passage and the chamber. The movable part includes a first end, a mediate portion and a second end. The first end of the movable part includes an inlet. Multiple lips extend from the outside of the first end of the movable part. The second end of the movable part includes a hole which is located surrounded by multiple claws. The mediate portion includes multiple slots defined radially through the wall thereof. The slots communicate with the inlet and the hole of the movable part. The seal member is engaged with the movable part and includes a head and a sealing portion. The head is engaged with the claws and seals the hole of the second end of the movable part. The sealing portion is located in the chamber. When the valve unit moves toward the chamber, the lips are stopped by the flange, and the slots communicate with the chamber. When the valve unit moves toward the through passage, the sealing portion is stopped by the flange, and the slots do not communicate with the through passage.

The primary object of the present invention is to provide a high volume tire valve assembly, and includes a stem and a valve unit. The valve unit includes a movable part and a seal member. When introducing pressurized air into the tire valve assembly, the pressurized air enters into the through hole to move the valve unit toward the chamber, and the pressurized air enters into the tire via the chamber. When the pressurized air is stopped from entering the tire valve assembly, the valve unit is pushed back by the pressure in the tire to seal the inlet so that the pressurized air in the tire does not leak to keep the tire pressure.

The tire valve assembly includes less number of components and the components are easily manufactured. These components have large size so that a large hole or bore can be easily drilled to provide high volume of air flow.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
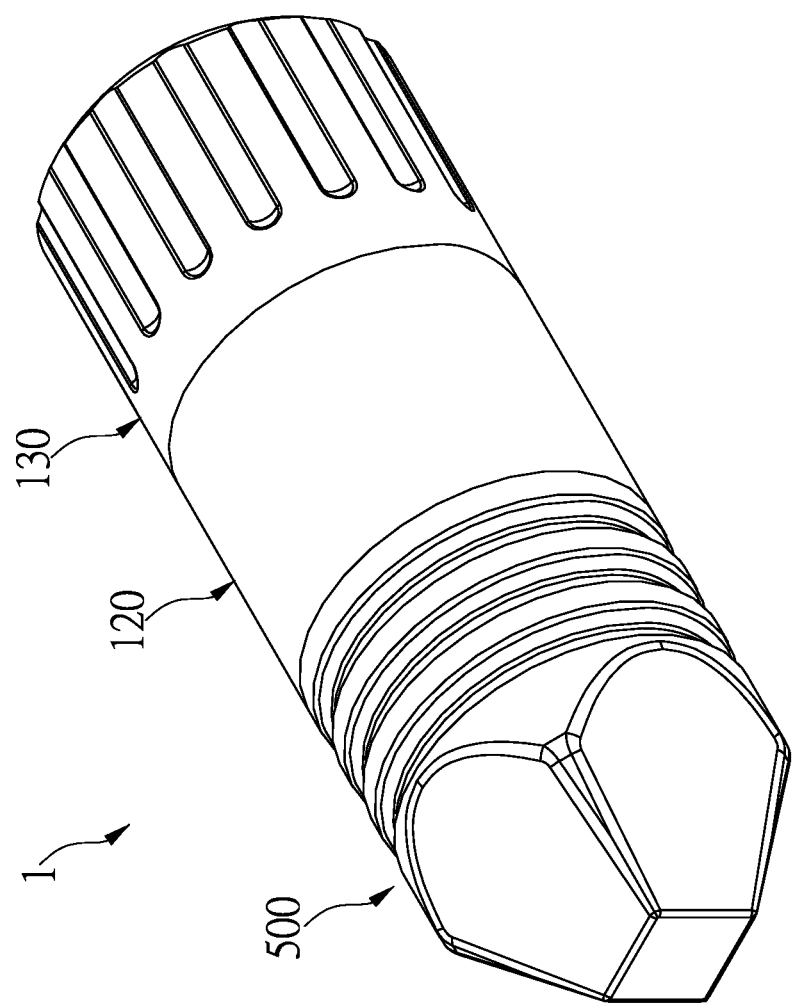
FIG. 1 is a perspective view to show the tire valve assembly of the present invention.

Referring to FIGS. 1 to 4, the tire valve assembly 1 of the present invention comprises a stem 10 and a valve unit 20. The stem 10 includes a first section 110, a second section 120 and a third section 130, wherein the second section 120 is formed between the first section 110 and the third section 130. The first section 110 includes a through passage 140 defined axially therethrough. The second section 120 includes a chamber 150 defined therein which communicates with the through passage 140. A flange 141 extends radially and inward from the conjunction portion between the through passage 140 and the chamber 150.

Figure 2:
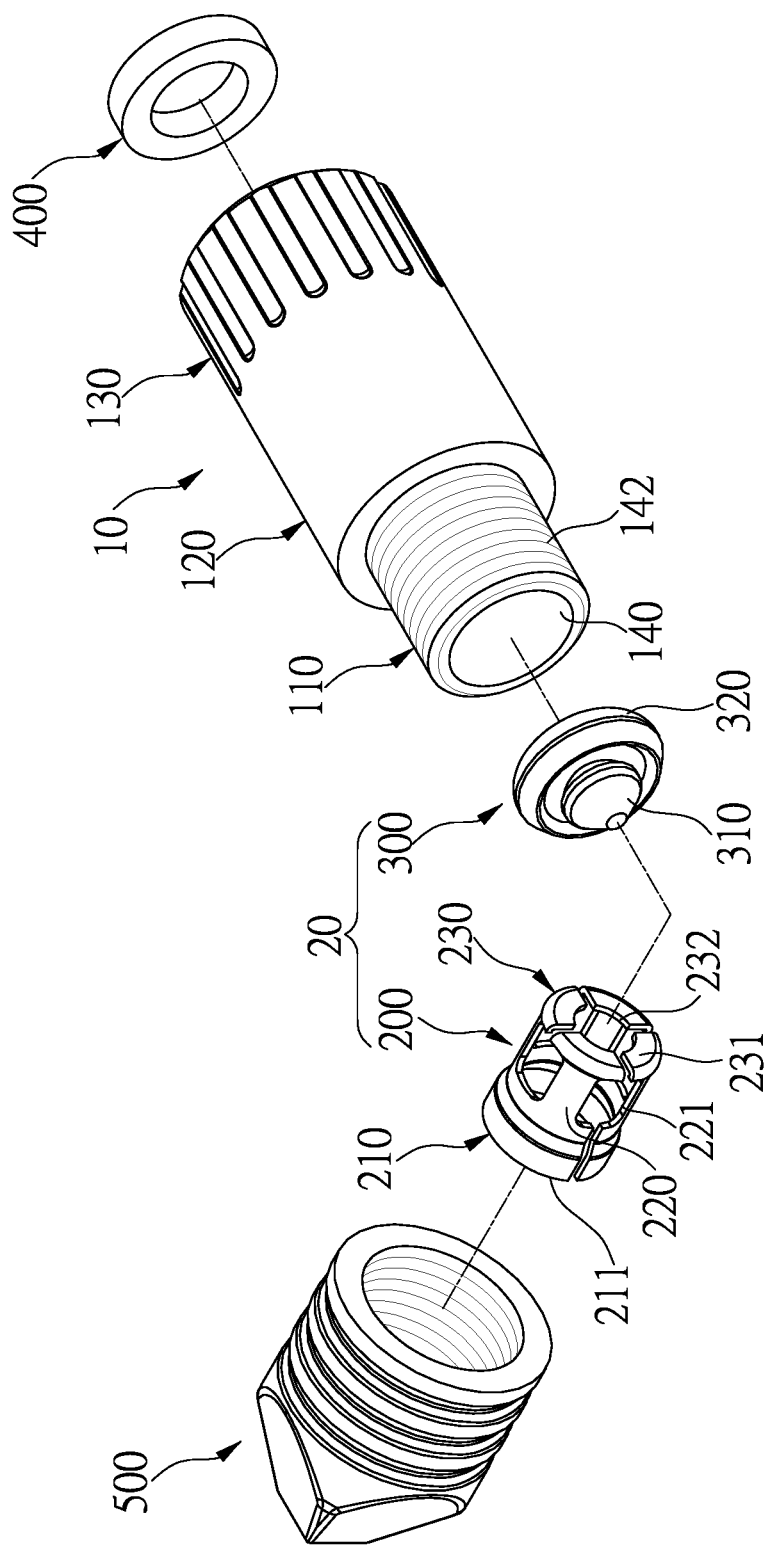
FIG. 2 is an exploded view of the tire valve assembly of the present invention.
Figure 3:
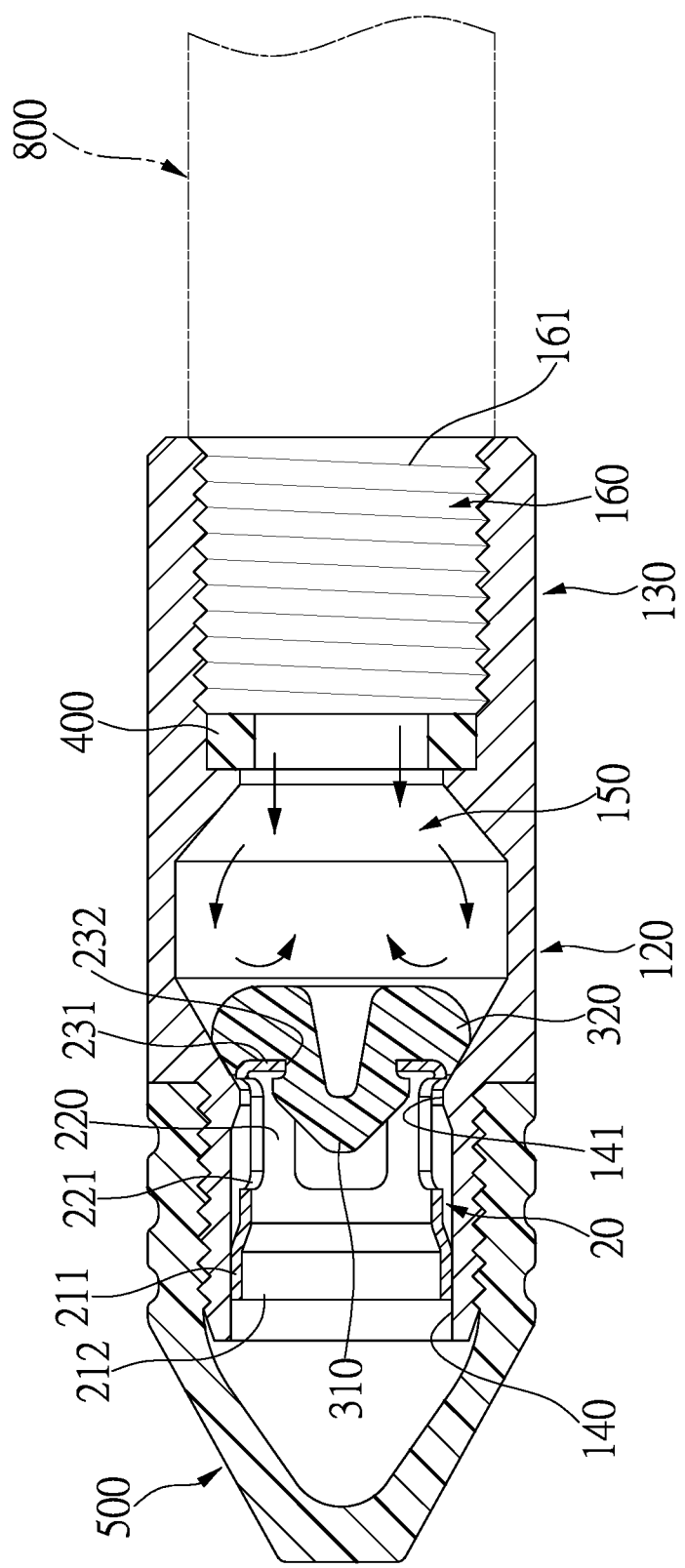
FIG. 3 shows that the sealing portion is stopped by the flange, and the slots do not communicate with the through passage.
Figure 4:
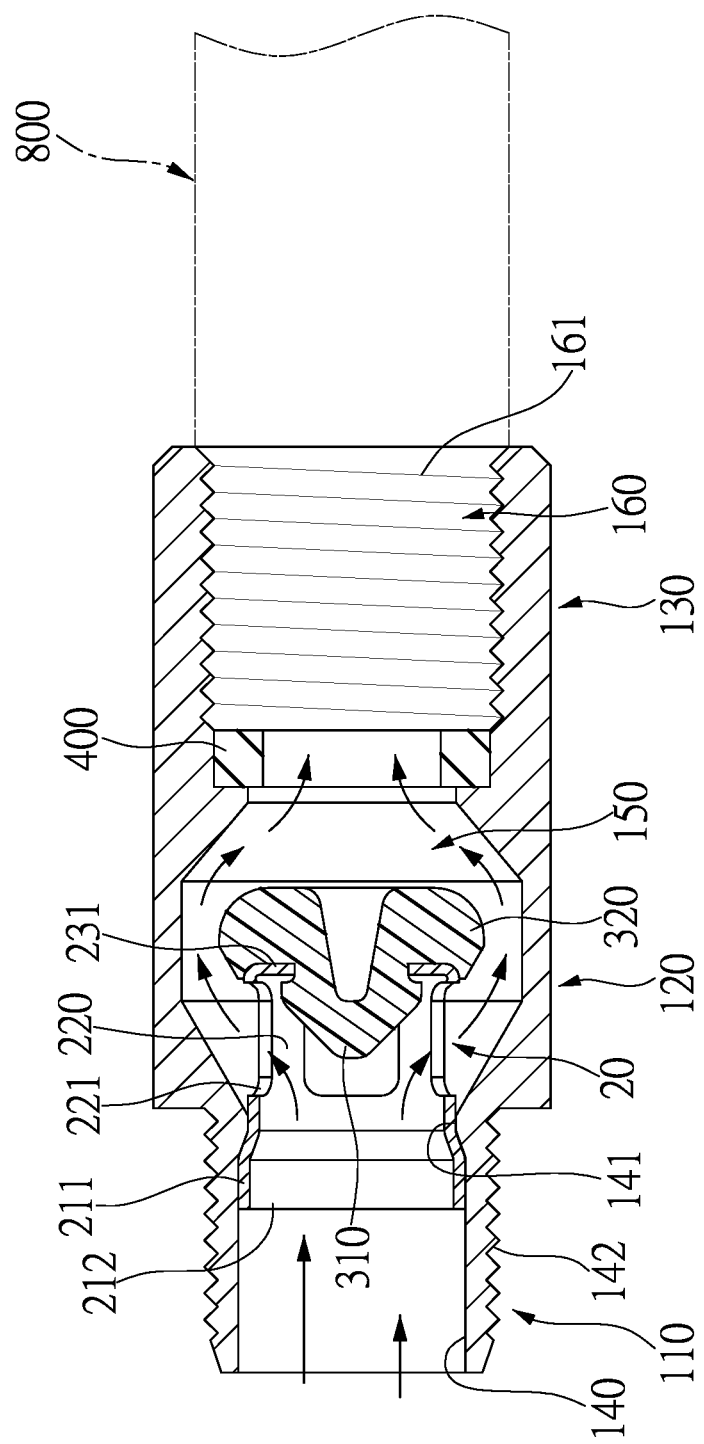
FIG. 4 shows that the tire is inflating by the tire valve assembly of the present invention.

As shown in FIGS. 2 to 4, the valve unit 20 includes a movable part 200 and a seal member 300. The movable part 200 is movably located in the through passage 140 and the chamber 150. The movable part 200 includes a first end 210, a mediate portion 220 and a second end 230, wherein the mediate portion 220 is formed between the first and second ends 210, 230 of the movable part 200. The first end 210 of the movable part 200 includes an inlet 212. Multiple lips 211 extend from the outside of the first end 210 of the movable part 200. The second end 230 of the movable part 200 includes a hole 232 which is located surrounded by multiple claws 231. The mediate portion 220 includes multiple slots 221 defined radially through the wall thereof. The slots 221 communicate with the inlet 212 and the hole 232 of the movable part 200.

As shown in FIGS. 1 to 10, the seal member 300 is engaged with the movable part 200 and includes a head 310 and a sealing portion 320. The head 310 is engaged with the claws 231 and seals the hole 232 of the second end 230 of the movable part 200. The sealing portion 320 is located in the chamber 150.

When inflating the tire (not shown), the valve unit 20 moves toward the chamber 150, and the lips 211 are stopped by the flange 141. The slots 221 communicate with the chamber 150. The pressurized air enters into the movable part 200 and flows into the chamber 150 via the slots 221. When stopping the inflation, the valve unit 20 moves toward the through passage 140, and the sealing portion 320 is stopped by the flange 141. The slots 221 do not communicate with the through passage 140.

As shown in FIGS. 1 to 10, the aperture of the through passage 140 may be 6 millimeter or 8 millimeter to correspond to the pump (not shown) commonly seen, wherein the tire valve assembly having the aperture of 8 millimeter has a significant effect on improving the gas flow.

As shown in FIGS. 1 to 10, when using the tire valve assembly 1 of the present invention, the tire valve assembly 1 is connected to the valve seat 800, and a pump (not shown) is connected to the tire valve assembly 1. The pressurized air is pumped into the through passage 140 and pushes the movable part 200 by the pressure. The valve unit 20 moves toward the chamber 150. When the movable part 200 moves, the slots 221 communicate with the chamber 150, and when the lips 211 are stopped by the flange 141, the area that the slots 221 and the chamber 150 form a large volume. Besides, the size of the parts of the tire valve assembly 1 of the present invention is larger than the conventional tire valve assembly, so that the large amount of the pressurized air can flow into the tire to increase the inflation efficiency. When stopping the inflation action, the pressurized air in the tire flows back and pushes the valve unit 20 toward the through passage 140, so that the slots 221 gradually blocked by the inside of the through passage 140 until the sealing portion 320 is stopped by the flange 141. The sealing portion 320 seals the gap between the inside of the through passage 140 and the periphery of the chamber 150 so that the pressurized air does not leak to maintain the interior pressure of the tire.

In the first embodiment of the present invention, the first section 110 of the stem 10 includes first outer threads 142 formed to the outside of the first section 110 of the stem 10 so as to be connected with the pump device (not shown). The third section 130 of the stem 10 includes a room 160 which communicates with the chamber 150. Multiple first inner threads 161 are formed to an inner periphery of the room 160 so as to be connected to the valve seat 800 such that the pressurized air can be introduced into the tire via the tire valve assembly 1. A sealing ring 400 is located in the room 160 and located next to the chamber 150 to prevent the pressurized air in the chamber 150 from leaking via the gap between the first inner threads 161 and the valve seat 800.

Figure 5:
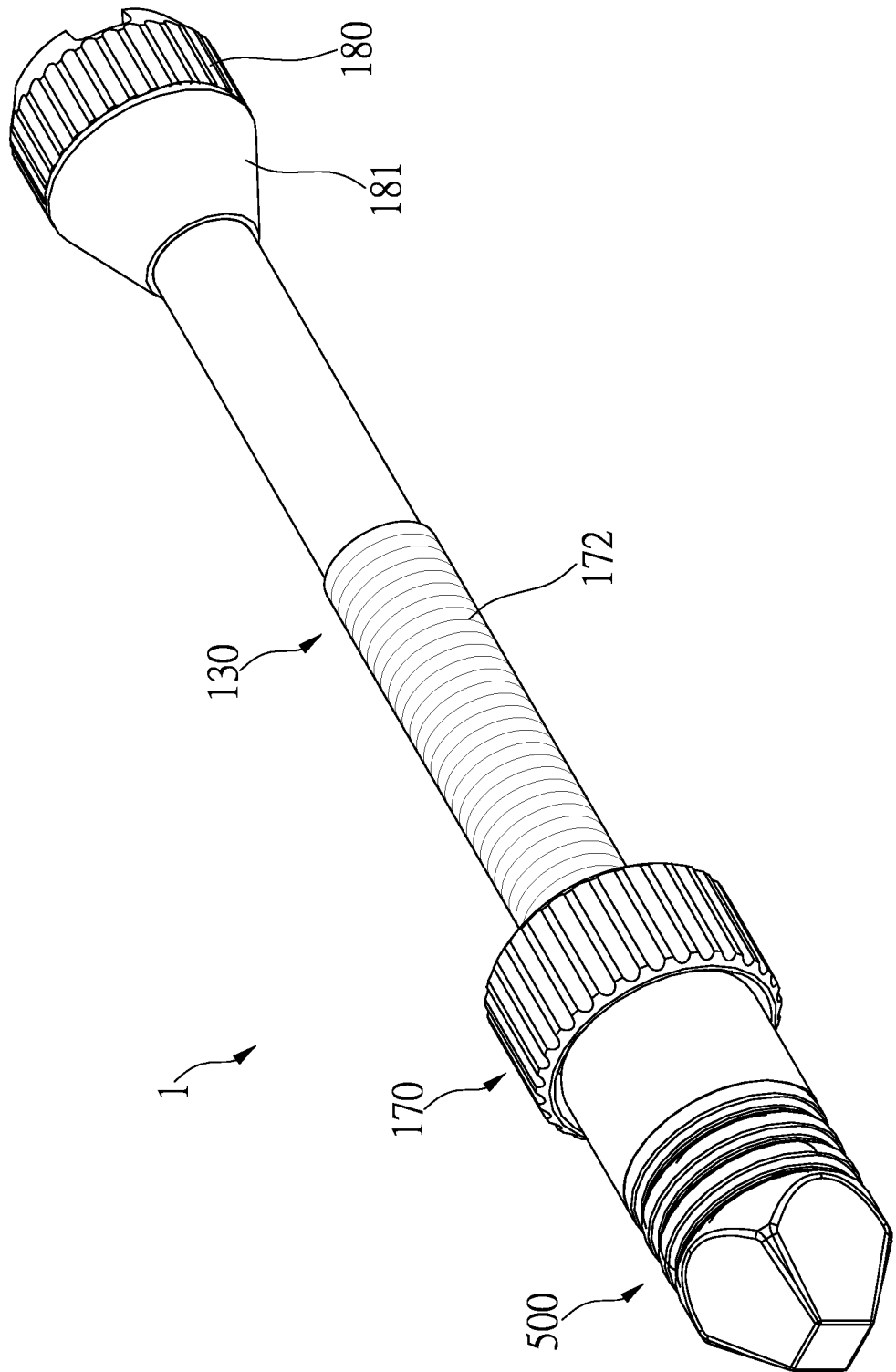
FIG. 5 is a perspective view to show the second embodiment of the tire valve assembly of the present invention.
Figure 6:
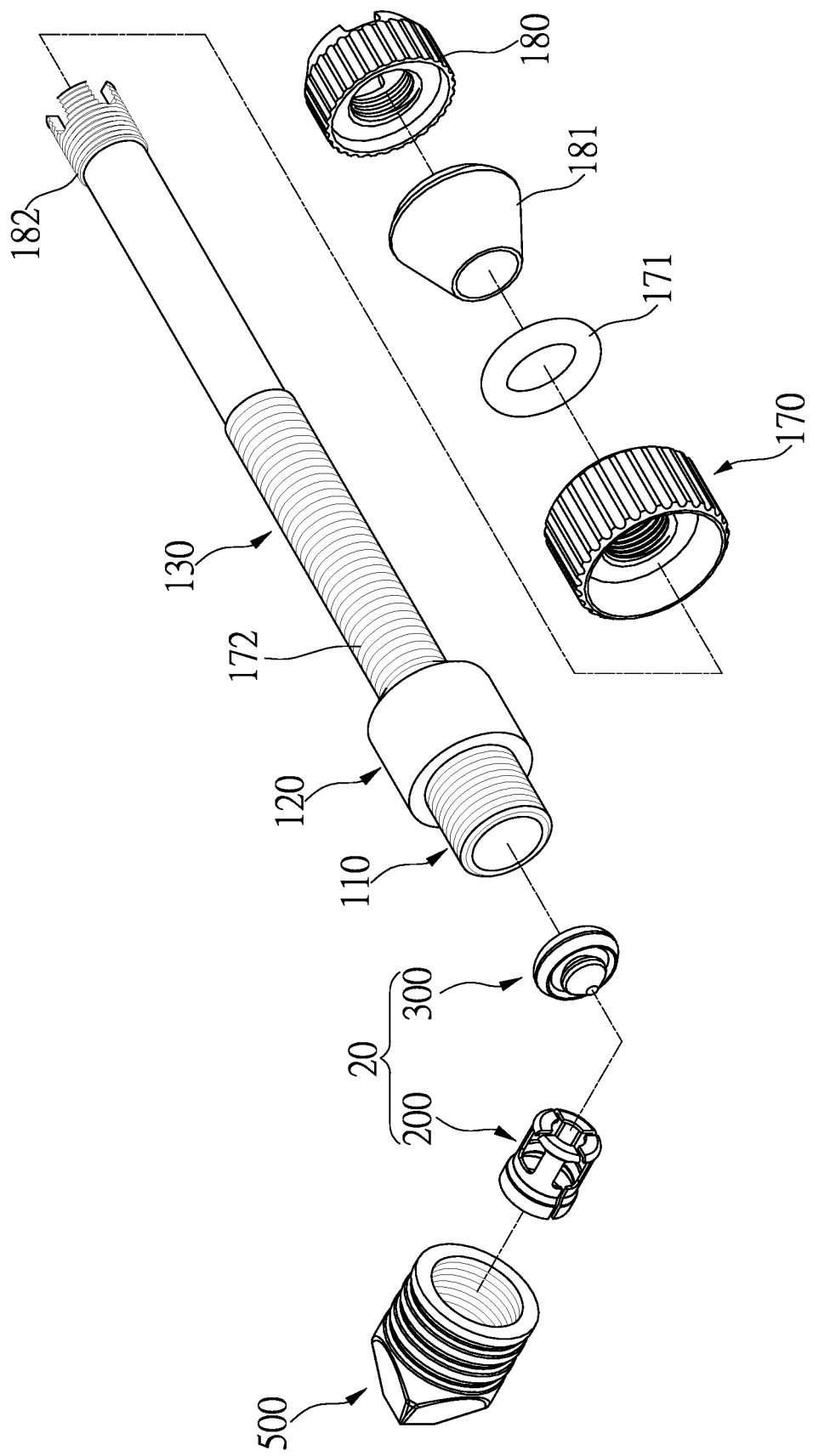
FIG. 6 is an exploded view of the second embodiment of the tire valve assembly of the present invention.
Figure 7:
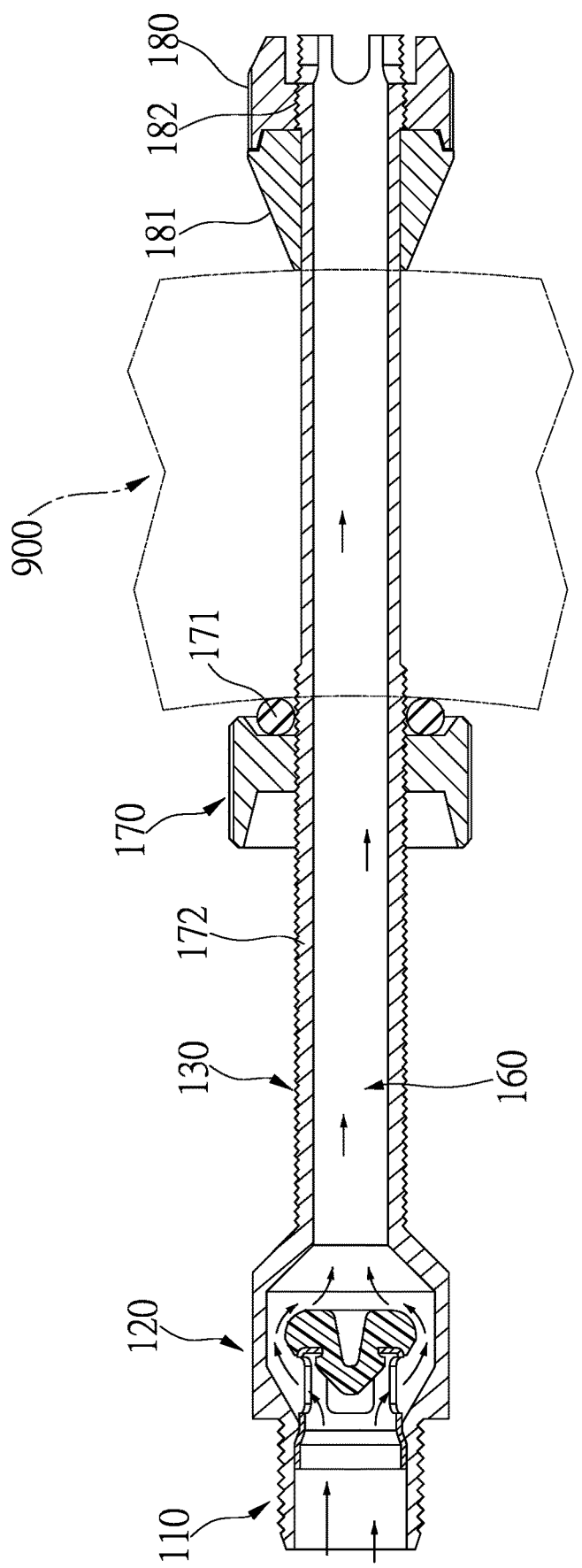
FIG. 7 shows that the tire is inflating by the second embodiment of the tire valve assembly of the present invention.

FIGS. 5 to 7 disclose the second embodiment of the present invention, wherein second outer threads 172 and third outer threads 182 are respectively formed to the outside of the third section 130 of the stem 10. The stem 10 includes a first collar 170 connected to the second outer threads 172, and a second collar 180 connected to the third outer threads 182. The distance between the first and second collars 170, 180 is adjustable by rotating the first collar 170 along the second outer threads 172. When installing the tire valve assembly 1 of the present invention to a wheel, the stem 10 extends through the rim 900 which is located between the first and second collars 170, 180. By rotating and moving the first collar 170 toward the second collar 180, the rim 900 is secured between the first collar 170 and the second collar 180. In this embodiment, the pressurized air can be directly introduced into the tire, and the valve seat 800 is not required.

Figure 8:
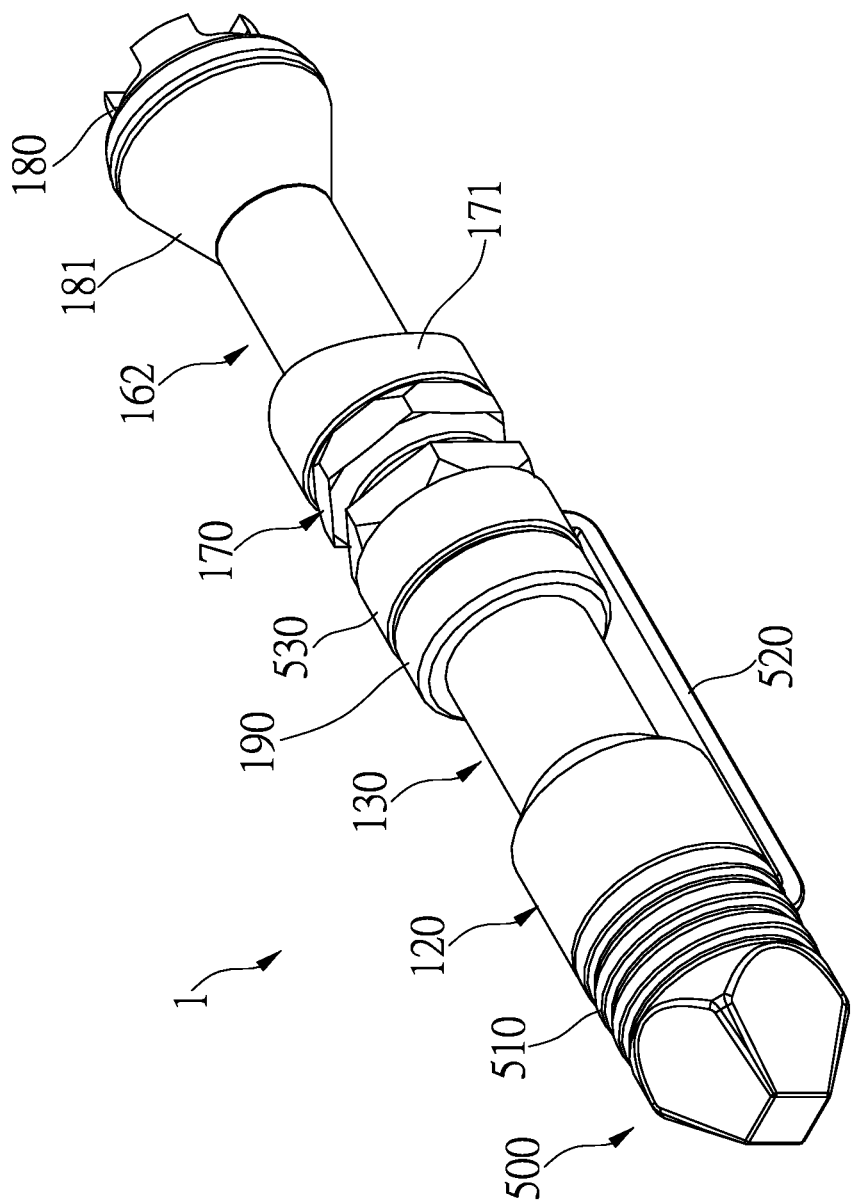
FIG. 8 is a perspective view to show the third embodiment of the tire valve assembly of the present invention.
Figure 9:
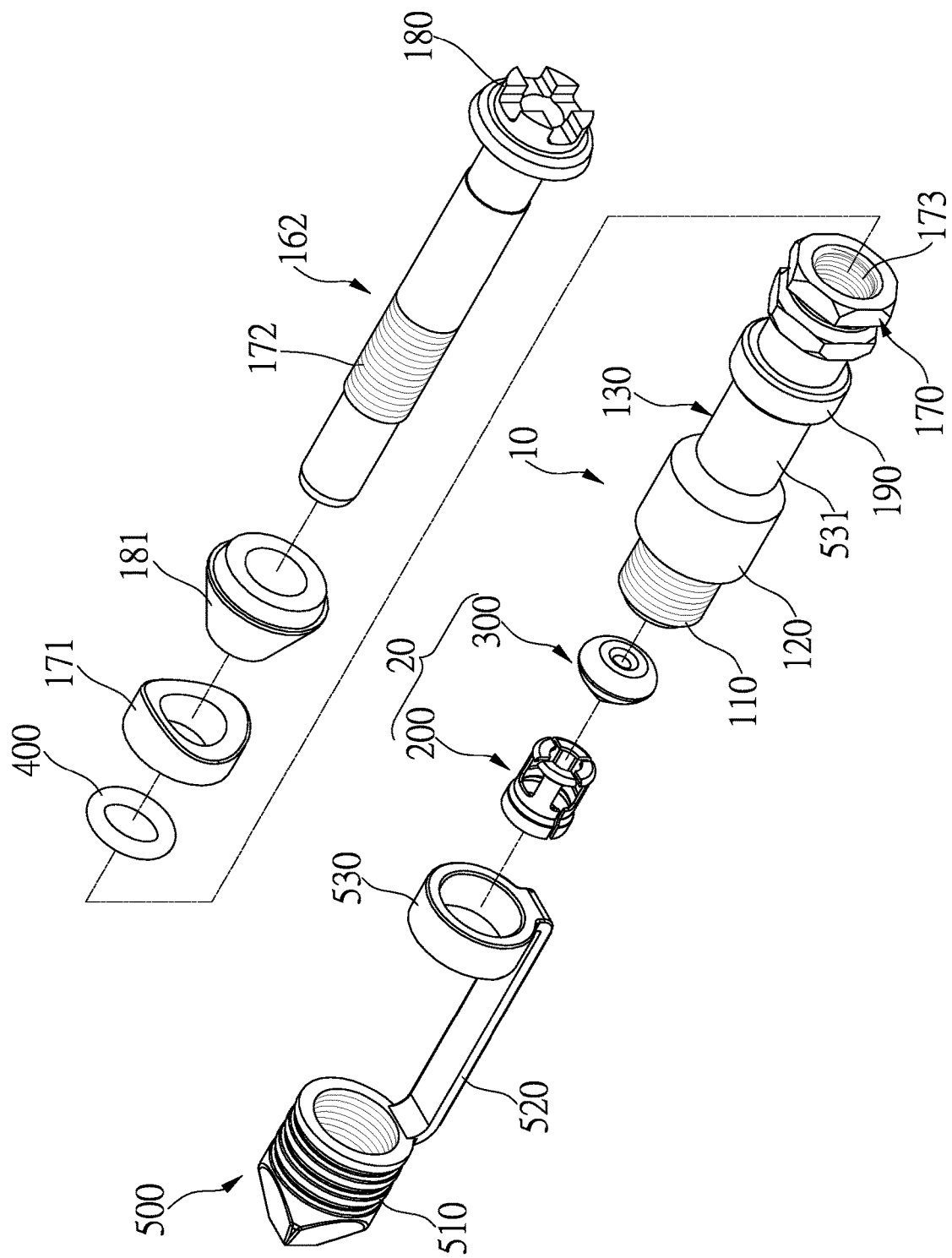
FIG. 9 is an exploded view of the third embodiment of the tire valve assembly of the present invention.
Figure 10:
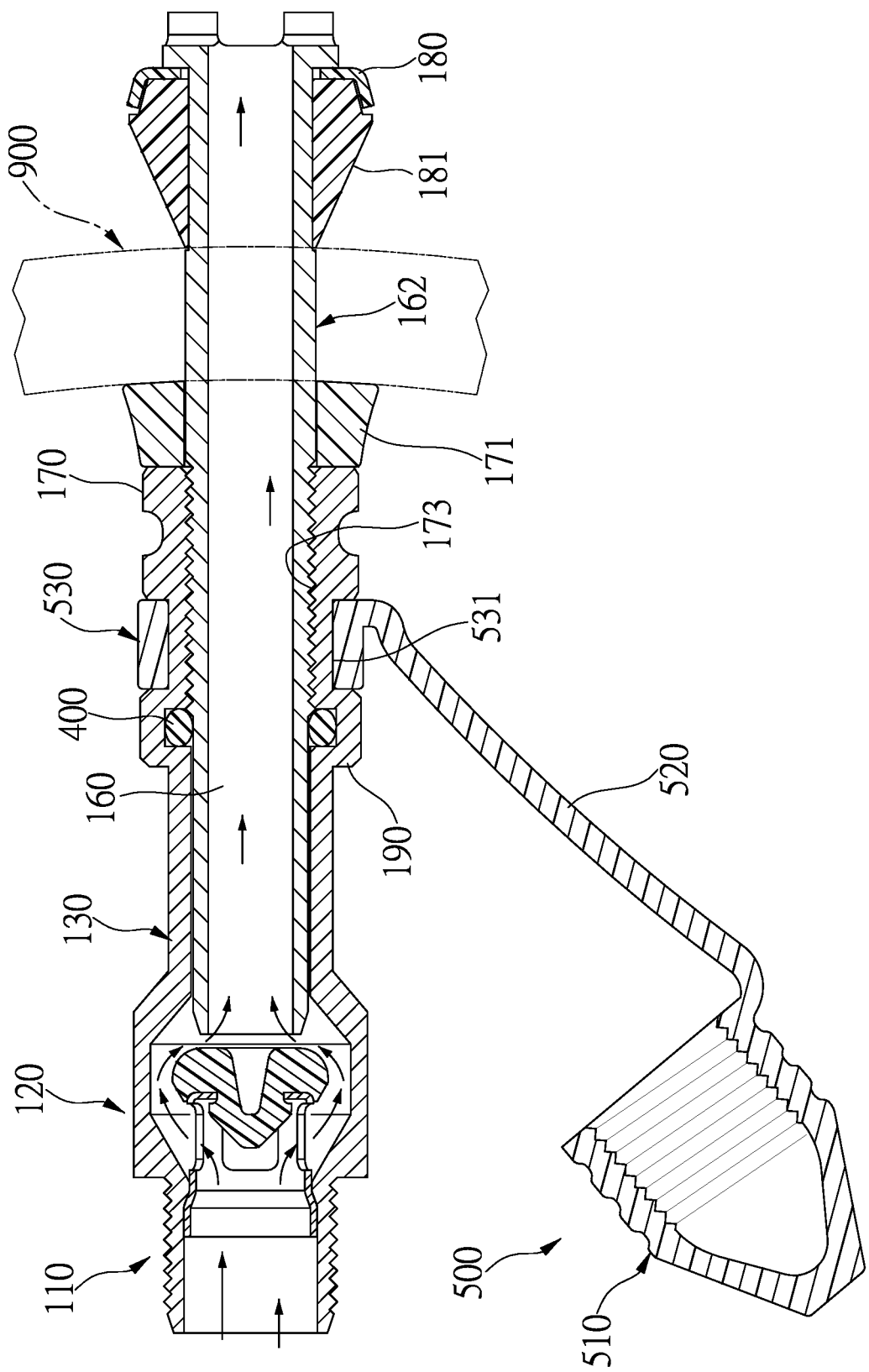
FIG. 10 shows that the tire is inflating by the third embodiment of the tire valve assembly of the present invention.
Figure 11:
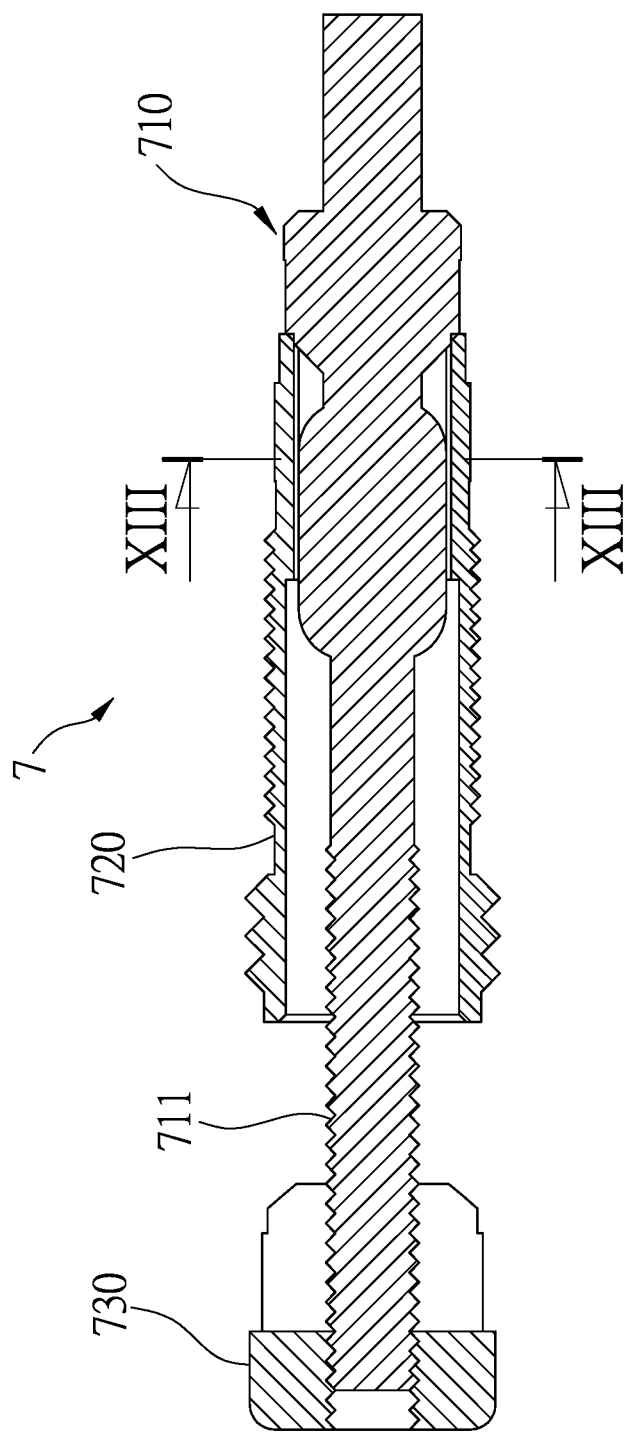
FIG. 11 shows an axial cross sectional view of a conventional knob type nozzle head.
Figure 12:
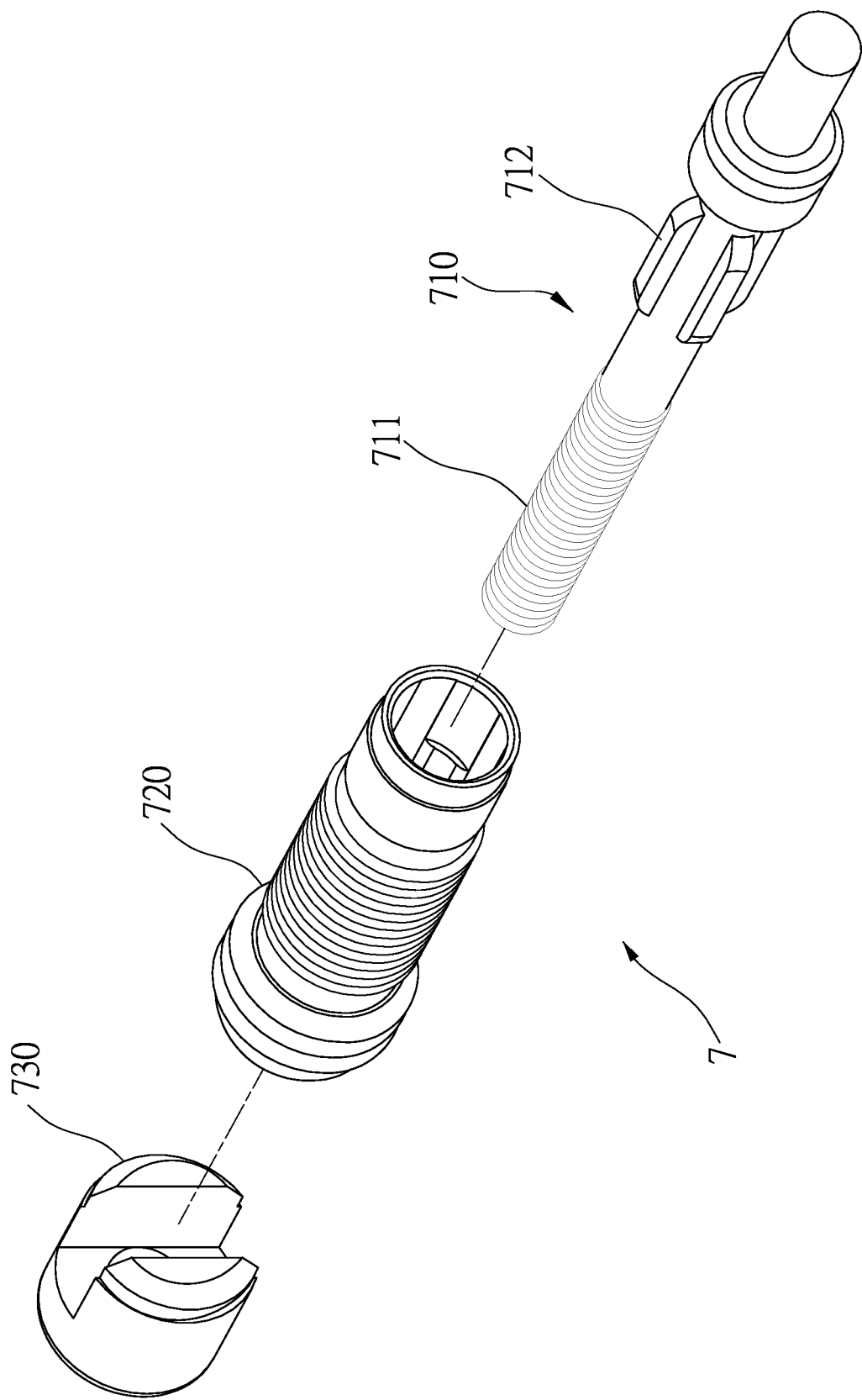
FIG. 12 is an exploded view of conventional knob type nozzle head.
Figure 13:
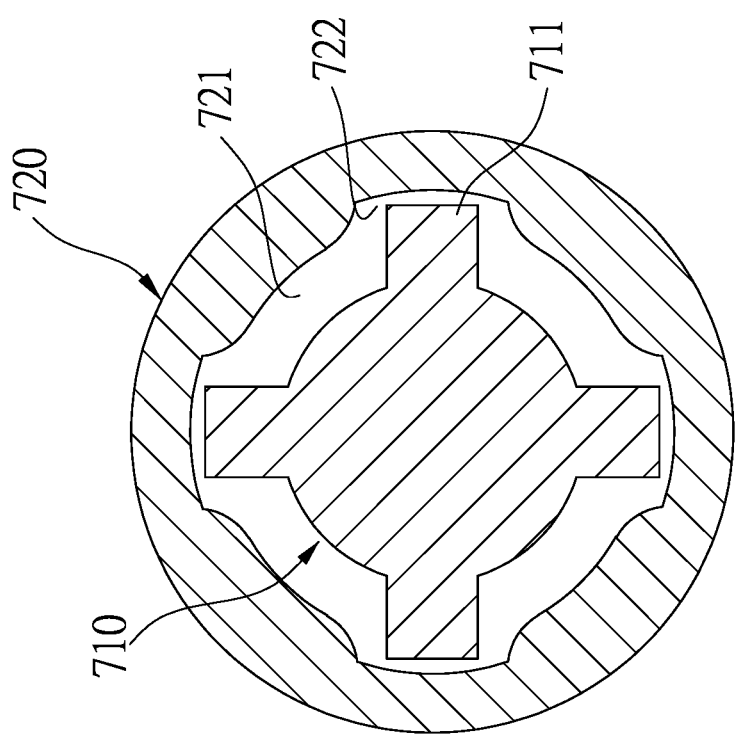
FIG. 13 shows an end cross sectional view of the conventional knob type nozzle head.

FIGS. 8 to 10 discloses the third embodiment, wherein the second section 130 of the stem 10 includes a first collar 170 and a third collar 190 wherein the first collar 170 is located at the distal end of the second section 130 of the stem 10. The third collar 190 is mounted to the second section 130 of the stem 10. A contact surface 531 is formed between the first collar 170 and the third collar 190. Multiple second inner threads 173 are formed to the inner periphery of the room 160. The stem 10 includes a rotary part 162 which has a second collar 180 formed to the distal end thereof. The rotary part 162 includes second outer threads 172 formed to the outside thereof, the rotary part 162 is partially located in the room 160. When installing the tire valve assembly 1 of the present invention to a wheel, the stem 10 extends through the rim 900 which is located between the first and second collars 170, 180. By rotating the rotary part 162 and moving the rotary part 162 toward the chamber 150, the second collar 180 moves toward the first collar 170. The distance between the second collar 180 and the first collar 170 is adjustable such that the rim 900 is secured between the second collar 180 and the first collar 170.

As shown in FIGS. 5 to 10, in the second and third embodiments, a first buffer 171 contacts one end of the first collar 170 and faces the second collar 180. A second buffer 181 contacts one end of the second collar 180 and faces the first collar 170. The first and second buffers 171, 181 provide buffering feature to the first collar 170 and the second collar 180 when the first collar 170 and the second collar 180 clamps the rim 900, such that the rim 900 is firmly clamped. The first and second buffers 171, 181 also prevent the rim 900 from being worn out if the first and second collars 170, 180 directly contact the rim 900.

As shown in FIGS. 1 to 7, in the first and second embodiments of the present invention, the a cover 500 is optionally and removably used to be mounted to the outside of the first section 110 of the stem 10 so as to protect the first section 110 from being damaged.

As shown in FIGS. 8 to 10, in the third embodiment of the tire valve assembly of the present invention, the cover 500 is made of flexible material, and includes a cap 510, a plate 520 and a ring 530. The cap 510 is mounted to the outside of first section 110 of the stem 10, and the ring 530 is mounted to the contact surface 531. The plate 520 is formed between the cap 510 and the ring 530. The cap 510 can be pulled and extended to be removed from the first section 110 of the stem 10, and the ring 530 is mounted to the contact surface 531 to avoid the cover 500 from dropping from the tire valve assembly 1.

While we have shown and described the embodiment in accordance with the present invention, it should be clear to those skilled in the art that further embodiments may be made without departing from the scope of the present invention.

What is claimed is:

1. A tire valve assembly comprising:
a stem having a first section, a second section and a third section, the second section formed between the first section and the third section, the first section including a through passage defined axially therethrough, the second section including a chamber defined therein which communicates with the through passage, a flange extending radially and inward from a conjunction portion between the through passage and the chamber, and
a valve unit including a movable part and a seal member, the movable part movably located in the through passage and the chamber, the movable part including a first end, a mediate portion and a second end, the mediate portion formed between the first and second ends of the movable part, the first end of the movable part including an inlet, multiple lips extending from an outside of the first end of the movable part, the second end of the movable part including a hole which is located surrounded by multiple claws, the mediate portion including multiple slots defined radially through a wall thereof, the slots communicating with the inlet and the hole of the movable part, the seal member engaged with the movable part and including a head and a sealing portion, the head being engaged with the claws and sealing the hole of the second end of the movable part, the sealing portion located in the chamber, when the valve unit moves toward the chamber, the lips are stopped by the flange, the slots communicate with the chamber, when the valve unit moves toward the through passage, the sealing portion is stopped by the flange, the slots do not communicate with the through passage.

2. The tire valve assembly as claimed in claim 1, wherein the first section of the stem includes first outer threads formed to an outside of the first section of the stem, the third section of the stem includes a room which communicates with the chamber, first inner threads are formed to an inner periphery of the room, a sealing ring is located in the room.

3. The tire valve assembly as claimed in claim 1, wherein the first section of the stem includes first outer threads formed to an outside thereof, the third section includes a room which communicates with the chamber, second outer threads and third outer threads are respectively formed to an outside of the third section of the stem, the stem includes a first collar connected to the second outer threads, and a second collar connected to the third outer threads, a distance between the first and second collars is adjustable by rotating the first collar.

4. The tire valve assembly as claimed in claim 1, wherein the first section of the stem includes first outer threads formed to an outside thereof, the third section includes a room which communicates with the chamber, the second section of the stem includes a first collar and a third collar wherein the first collar is located at a distal end of the second section of the stem, the third collar is mounted to the second section of the stem, a contact surface is formed between the first collar and the third collar, second inner threads are formed to an inner periphery of the room, the stem includes a rotary part which has a second collar formed to a distal end thereof, the rotary part includes second outer threads formed to an outside thereof, the rotary part is partially located in the room, a distance between the second collar and the first collar is adjustable by rotating the rotary part.

5. The tire valve assembly as claimed in claim 3, wherein a first buffer contacts one end of the first collar and faces the second collar, a second buffer contacts one end of the second collar and faces the first collar.

6. The tire valve assembly as claimed in claim 4, wherein a first buffer contacts one end of the first collar and faces the second collar, a second buffer contacts one end of the second collar and faces the first collar.

7. The tire valve assembly as claimed in claim 1, wherein a cover is mounted to an outside of the first section of the stem.

8. The tire valve assembly as claimed in claim 4 further comprising a cover made of flexible material, the cover including a cap, a plate and a ring, the cap mounted to the outside of first section of the stem, the ring mounted to the contact surface, the plate formed between the cap and the ring.

* * * * *